United States Patent [19]
Harman et al.

[11] Patent Number: 5,755,309
[45] Date of Patent: May 26, 1998

[54] VEHICLE DOORWAY LIFT

[75] Inventors: Marvin E. Harman, Rock; Jimmie D. Maish, Jr., Augusta, both of Kans.

[73] Assignee: Retrofit Lifts, Inc., Rock, Kans.

[21] Appl. No.: 599,762

[22] Filed: Feb. 12, 1996

[51] Int. Cl.⁶ .................................................. B66B 9/08
[52] U.S. Cl. ........................................ 187/200; 414/921
[58] Field of Search .............................. 187/200, 201, 187/267, 268; 414/921

[56] References Cited

U.S. PATENT DOCUMENTS

| | | | |
|---|---|---|---|
| 4,026,387 | 5/1977 | Abreu | 187/200 |
| 4,353,436 | 10/1982 | Rice et al. | 187/200 |
| 4,958,979 | 9/1990 | Svensson | 414/549 |
| 5,533,594 | 7/1996 | Tremblay et al. | 187/201 |

OTHER PUBLICATIONS

Mobile-Tech Corporation Brochure, Jan. 1992.
Atwood Power Jack Manual, May 1987.

*Primary Examiner*—Kenneth Noland
*Attorney, Agent, or Firm*—Shook, Hardy & Bacon L.L.P.

[57] ABSTRACT

A lift arrangement is mounted adjacent the doorway of a vehicle. The arrangement includes a first electrically powered screw jack mounted to the frame of the vehicle adjacent one side of the doorway and a second electrically powered screw jack mounted to the frame of the vehicle adjacent the other side of the doorway. A first support bracket is positioned adjacent the lower end of the first jack. A second support bracket is positioned adjacent the lower end of the second jack. A platform has a pair of connecting portions disposed adjacent opposite ends of the platform. Each connecting portion engages one of the brackets to support the platform in a generally horizontal manner. The first and second jacks are simultaneously activated by a single switch to lower and raise the platform between a position adjacent the ground surface and an elevated position.

5 Claims, 2 Drawing Sheets

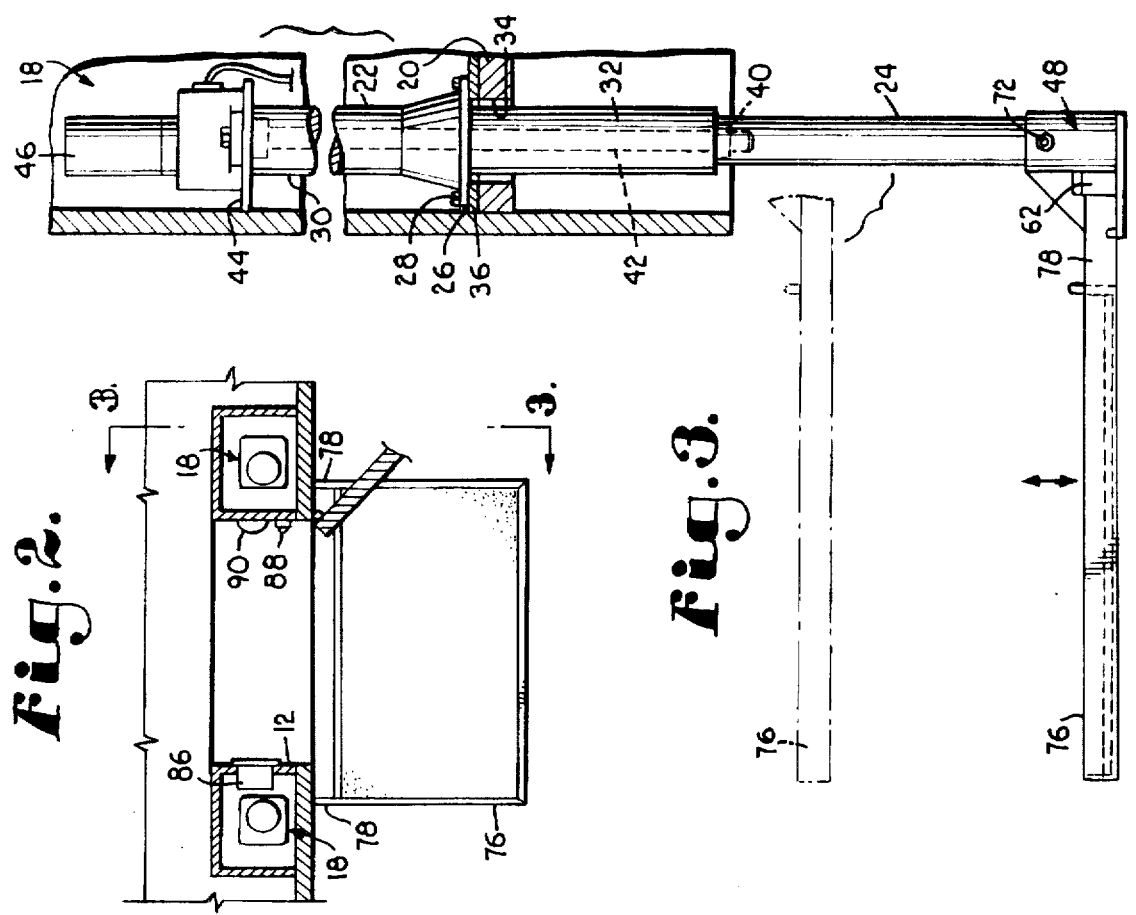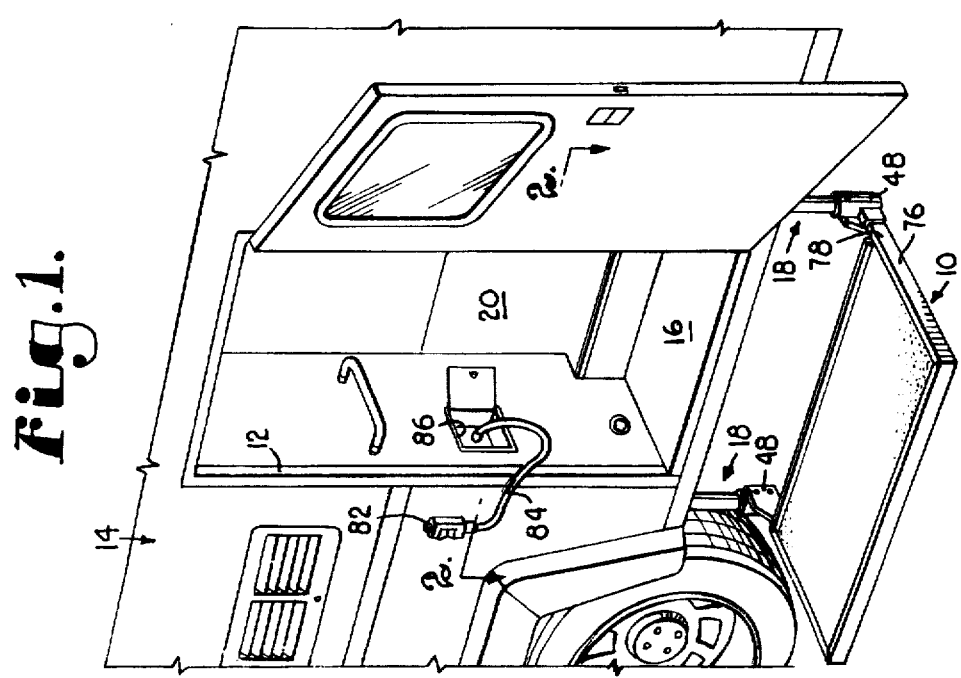

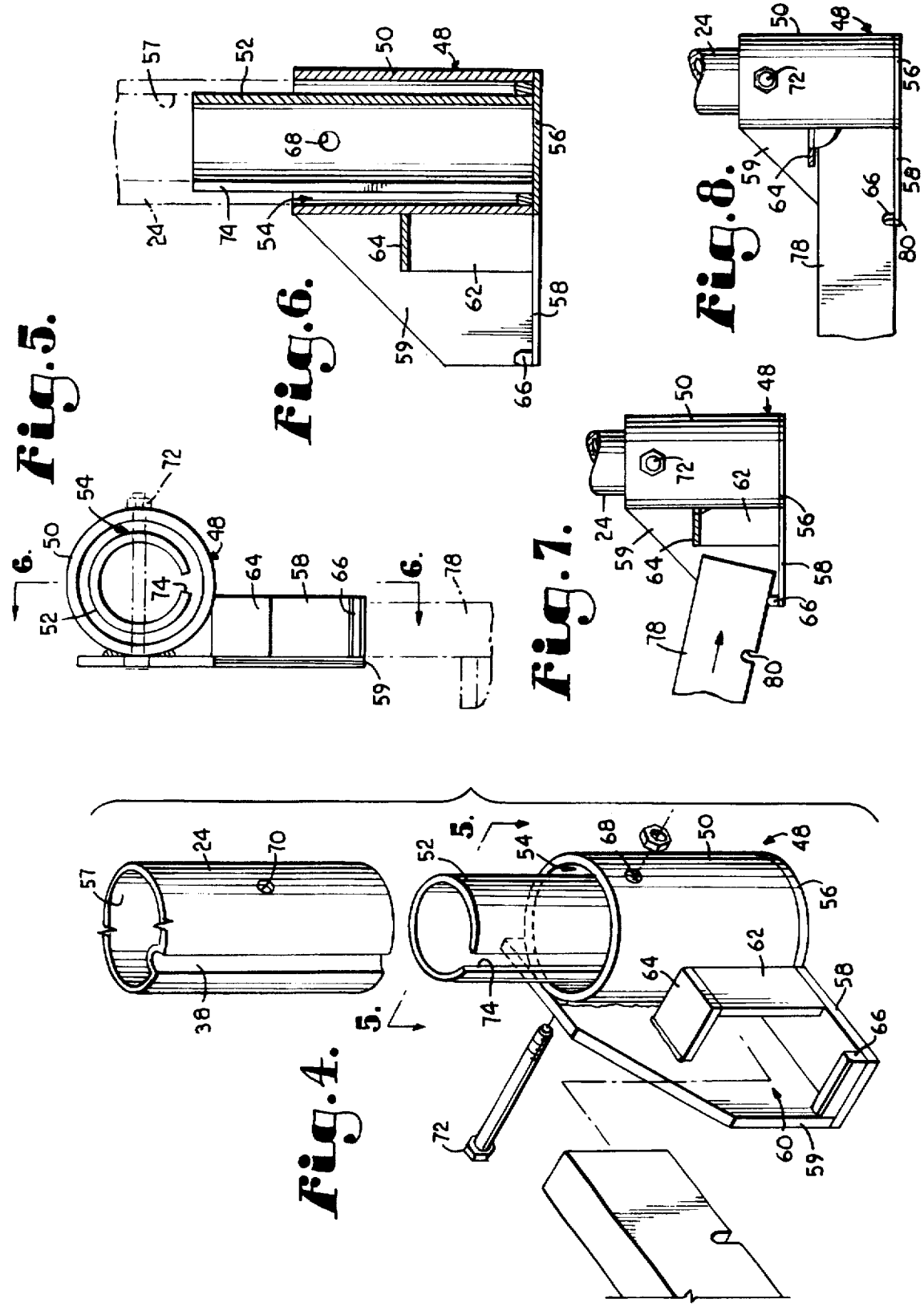

VEHICLE DOORWAY LIFT

This invention relates to lifts positioned adjacent the doorway of a vehicle to permit an object or person to be raised or lowered between ground level and the level associated with the vehicle.

Entering and exiting certain types of vehicles, for example recreational vehicles such as campers and motor homes, presents particular difficulties for elderly persons and/or disabled persons. More specifically, the floors of these vehicles typically are elevated a substantial distance above ground level and utilize a step arrangement which may be fairly steep and possibly unstable. Further, the step arrangements often do not have a handrail or support grip, thus increasing the difficulty of an elderly/disabled person's entry into the vehicle and increasing the possibility of injury to that person.

In the past, various lift arrangements have been utilized to allow an elderly/disabled person access to the interior of a vehicle. These lifts typically utilize hydraulic cylinders in order to perform the lifting action. Therefore, these arrangements often have both an electrical motor driven by the electrical power source of the vehicle and a hydraulic pump driven by the electric motor. The lifting platform of these arrangements typically is positioned across the doorway of the vehicle in a generally vertical orientation. As the lift is actuated, the lift first pivots downwardly to a horizontal orientation and then is lowered downwardly to the ground surface in this horizontal orientation.

These hydraulic lifts are disadvantageous for a number of reasons. First, because of the components necessary to run the hydraulic system, for example the cylinders, pump and electric motor, the lifts tend to require a substantial amount of space within the vehicle. Additionally, because of the numerous components and the rigid frame-like structure used with the hydraulic cylinders, the lifts are often relatively heavy. Further, because of the intricacies of the hydraulic system and the number of components, the cost of such lifts is typically expensive, and the installation and repair are often complex and tedious. Still further, there is always the possibility of a hydraulic fluid leak within the vehicle which could result in personal injury or vehicle damage.

An additional major drawback associated with such lifts is that the lifting platform typically partially obstructs the doorway of the vehicle when not in use. This obstruction of the doorway presents a fire hazard especially when these lifts are used in recreational vehicles wherein persons often sleep. To overcome this potential fire hazard, it is often required that an extra doorway be added to the recreational vehicle for installation of the lift, thus leaving one unobstructed doorway. As is apparent, this type of customizing of a recreational vehicle can be expensive and result in space within the vehicle being used inefficiently.

The prior art lifts also often had to use a complex arrangement of limit switches triggered by the lift platform reaching its uppermost or lowermost positions. The limit switches, once actuated, would disconnect the powering structure used to raise and lower the platform.

Therefore, a novel lift arrangement is needed to overcome the drawbacks associated with the prior lift arrangements discussed above.

Accordingly, it is a primary object of the present invention to provide a lift arrangement for a vehicle which is constructed of components that are less complex, lighter, and less expensive than prior lift arrangements.

A further object of this invention is to provide a lift arrangement which does not interfere with ingress and egress through the doorway of the vehicle, and thus, which does not create a fire hazard.

Another object of this invention is to provide a lift arrangement which is more compact than prior lift arrangements and requires less installation space within a vehicle.

These and other important aims and objectives of the present invention will be further described, or will become apparent from the following description and explanation of the drawings, wherein:

FIG. 1 is a diagrammatic view of a lift embodying the principles of this invention installed adjacent a doorway of a recreational vehicle, and showing the actuating switch for the lift withdrawn from its storage compartment;

FIG. 2 is a detailed cross-sectional view taken generally along lines 2—2 of FIG. 1 and showing the positioning of the screw jacks of the present invention on opposite sides of the doorway;

FIG. 3 is an enlarged detailed cross-sectional view taken generally along line 3—3 of FIG. 2 and showing the internal screw of the jack in broken lines and the raised position of the platform in phantom lines;

FIG. 4 is an enlarged fragmentary exploded prospective view of the structures used to removably attach the platform to the lower ends of the screw jacks;

FIG. 5 is a top plan view taken generally along the lines 5—5 of FIG. 4 and showing the connecting bars of the platform in phantom lines;

FIG. 6 is a detailed cross-sectional view taken generally along lines 6—6 of FIG. 5;

FIG. 7 is a fragmentary side elevational view of the connecting bracket shown in FIG. 4 and depicting an intermediate step of securing the lift platform to the bracket; and FIG. 8 is a view similar to FIG. 7 showing the lift platform secured to one of the support brackets, parts being broken away to reveal details of construction.

A vehicle doorway lift embodying the principles of this invention is broadly designated in the drawings by the reference numeral 10. Lift 10 is installed adjacent a doorway 12 of a recreational vehicle 14, as best shown in FIG. 1. In addition to being installed in a recreational vehicle, such as a motor home or camper, lift 10 can also be installed in other vehicles, for instance cargo or passenger vans. Lift 10 allows easy access to the interior of vehicle 14 by raising a person or object from ground level to a vertical height adjacent a step area 16 of the vehicle, as will be described in more detail below.

Lift 10 includes a pair of screw jacks 18 mounted to a floor 20 of the vehicle on opposite sides of doorway 12 as best shown in FIGS. 2 and 3. Each jack 18 includes a generally cylindrical housing 22 into which a generally cylindrical ram 24 is telescopically received. Housing 22 has a mounting flange 26 formed at a location intermediate the vertical length of the housing. Flange 26 secures housing 22 to floor 20 by a plurality of bolts 28.

Flange 26 divides housing 22 into an upper section 30 which is disposed above floor 20 and a lower section 32 which extends below floor 20 through a hole 34 formed therein. The lower end of section 32 of flange 26 is positioned approximately at the same vertical height as step area 16. A plate 36 can be positioned between flange 26 and the upper surface of floor 20 to more evenly distribute the load exerted on the floor during operation of the jack. That is, plate 36 has a larger surface area than flange 26 to spread the forces exerted on the jack over a larger area of the floor.

Ram 24 is telescopically received in the lower end of housing 22 so that it can slide upwardly and downwardly therein. Ram 24 has a longitudinal dimple 38 formed on its outer surface and extending the length of the ram as shown in FIG. 4. Dimple 38 is engaged by a longitudinal protrusion (not shown) formed on the inner surface of housing 22 to prevent rotation of the ram within the housing while at the same time allowing upward and downward movement.

The upper end of ram 24 has a collar 40 disposed on and secured to its inner surface. Collar 40 has a female thread surface which engages a male thread surface of a screw 42 positioned in the interior of the ram. The upper end of screw 42 is rotatably supported by a bracket 44 disposed adjacent the upper end of housing 22. The upper end of the screw is also rotatably connected to an electric reversible drive motor 46. Actuation of motor 46 and thus screw 42 in one direction will result in ram 24 sliding downwardly within housing 22. Actuation of the motor and the screw in the other direction will result in the ram sliding upwardly within the housing.

Motor 46 has an overriding clutch built into it such that when the ram reaches its maximum extended or retracted length, the screw will cease to rotate and a clicking noise will emulate from the motor.

It is preferable that each jack 18 be capable of lifting approximately 2,500 pounds. Both jacks also should be capable of being powered by a single 12 volt battery. One type of jack that has been found to work suitably and is commercially available is the "Atwood Power Jack" manufactured by Atwood Mobile Products of Rockford, Ill.

Each jack 18 has a support bracket 48 removably disposed on its lower end. Each bracket 48 has an outer cylindrical portion 50 and an inner cylindrical portion 52 disposed in concentric relationship with one another as best shown in FIGS. 4–6. The lower edges of cylinders 50 and 52 are attached to a circular bottom 56 as best shown in FIG. 6. An annular slot 54 is formed between the inner surface of cylinder 50 and the outer surface of cylinder 52. When bracket 48 is positioned on the lower end of its respective ram 24, the side wall of the lower end of the ram (as shown in phantom lines in FIG. 6) is received in annular slot 54 such that inner cylinder 52 is received in the inner bore 57 of the ram. It has been found that the thickness of slot 54 should closely approximate the thickness of the side wall of ram 24 in order to allow for more uniform load transfer from the platform to the jacks during lifting, as will be more fully described below.

Each bracket 48 has a horizontal support plate 58 extending outwardly from and connected to bottom 56. A gusset 59 is attached to the side surface of cylinder 50 and to the top surface of plate 58 to support plate 58 in its horizontal orientation. A rectangular receiving aperture 60 is formed adjacent the upper surface of plate 58 by a vertical member 62 attached to the upper surface of plate 58 and an upper member 64 extending between vertical member 62 and gusset 59. The upper surface of plate 58 also has an elongated protrusion 66 attached to its upper surface. Bracket 48 is preferably made of steel and the various components (i.e., cylinders 50, 52, bottom 56, plate 58, gusset 59, members 62 and 64, and protrusion 66) are connected together by any suitable means, for example welding.

As best shown in FIGS. 4–6, cylinders 50 and 52 have aligned holes 68 formed in their side walls. Holes 68 align with holes 70 formed in the side wall of ram 24 when bracket 48 is positioned on the lower end of the ram. An attaching bolt 72 is then positioned through aligned holes 68 and 70 to secure the bracket to the lower end of the ram.

Inner cylinder 52 has an elongated slot 74 formed in its side wall, as best shown in FIGS. 4 and 5. Slot 74 receives the convex portion of dimple 38 formed on the inner surface of ram 24 so that the lower end of the ram can be positioned in slot 54.

A lift platform 76 has a pair of attachment bars 78 extending from opposite ends of the platform. Each bar 78 is generally rectangular in shape such that the end of the bar can be received in the rectangular aperture 60 of one of the brackets 48. Each bar 78 also has a notch 80 formed on its lower surface. Bars 78 engage brackets 48 to secure platform 76 in a generally horizontal orientation between screw jacks 18 as shown in FIG. 1.

To position platform 76 in its horizontal orientation, the platform is angled slightly upwardly as shown in FIG. 7 and the ends of bars 78 are positioned into the corresponding rectangular apertures 60 of the brackets. After the bars 78 engage apertures 60, the platform is tilted downwardly so that notches 80 engage protrusions 66 of the horizontal support plates 58 as shown in FIG. 8. As is apparent, platform 76 can be easily removed from between the screw jacks by simply tilting upwardly on the platform so that notches 80 are disengaged from protrusions 66 and then disengaging bars 78 from apertures 60. After the platform is disengaged, it can be stored in any appropriate place, for instance, within the vehicle itself or in a storage compartment located on the vehicle.

In operation, screw jacks 18 are actuated simultaneously by a single toggle switch 82. Switch 82 typically will have an "off" position, a "raise" position to one side of the "off" position and a "lower" position to the other side of the "off" position. Switch 82 is preferably positioned on a flexible cord 84 so that a person standing on the platform can easily grasp the switch and actuate the screw jacks to raise and lower the platform. When not in use, switch 82 and the cord 84 can be rolled up and stored in storage compartment 86. Compartment 86 is located directly inside of doorway 12 so that a person standing on the platform can easily withdraw the switch and cord from the compartment.

Actuation of switch 82 to the "raise" position, causes motors 46 of the screw jacks to rotate in a direction which corresponds to the upward movement of rams 24, and thus raising of the platform. Moving the switch to the "lower" position results in opposite rotation of the motors, and thus lowering of the platform.

As shown in FIG. 3, platform 78 is positionable between a lowered position wherein it is adjacent the ground surface and a raised position (shown in phantom lines) in which it is adjacent step area 16 to allow easy access to the interior of vehicle 14.

The lowered position of platform 76 corresponds to the fully extended position of the screw jacks. Thus, as the platform reaches its lowest position, the clutches built into motors 46 will prevent further rotation of the screws within the jacks and a clicking noise will be heard. The clicking noise signals the user actuating switch 82 to move the toggle switch to its "off" position from the "lower" position. The raised position of platform 76 corresponds to the fully retracted position of the screw jacks. Thus, upon the platform reaching its uppermost level, the clutches of the motors will prevent rotation of the screws within the jacks and again the clicking noise will be heard. At this point, the user moves switch 82 to its "off" position from the "raise" position.

A secondary toggle switch 88 can also be fixably positioned adjacent doorway 12, as best shown in FIG. 2. Switch 88 performs the same functions as switch 82, but cannot be moved from its location. Further, a light 90 can be positioned adjacent step area 16. As the lift is actuated, electrical current can also be sent to the light to illuminate the step area.

As described, the thicknesses of annular slots 54 of brackets 48 closely approximates the thicknesses of the side walls of the rams on which the brackets are located. Thus, cylinders 52 and 50 closely surround the lower end of the rams on which they are located. It has been found that this close fitting arrangement results in an advantageous load transfer from the platform to the screw jacks. More specifically, this connecting arrangement results in a more uniform transfer of the load of the platform about the entire periphery of each of the rams. Thus, the moment force exerted on the ram by the weight of a person or object positioned on the platform is reduced.

It was found that if the moment force applied to the rams is too great, premature wear of the screws and motors may result. Therefore, by utilizing the concentric cylinder structure of the brackets to more evenly distribute the weight positioned on the platform about all sides of the rams, the moment stresses applied to the jacks are reduced resulting in longer life of the jacks.

Lift 10 provides an easy and effective structure for raising or lowering people or objects between ground level and a level associated with the interior of the vehicle. The lift utilizes the relatively simple structure of the screw jacks operated simultaneously to perform the lifting function. Further, the lift utilizes the internal clutches of motors 46 to demarcate the uppermost and lowermost positions of the platform instead of a complex arrangement of limit switches often found in prior art lifts. As is apparent, the components of lift 10 are less complex, lighter, and less expensive than most comparable hydraulic lifts. Furthermore, because the platform of the lift does not need to be lowered from a vertical position to a horizontal position as part of the lifting process, the lift does not interfere with ingress and egress through the doorway of the vehicle. Additionally, because the relatively compact structure of the screw jacks is the only structure which needs to be positioned within the vehicle, lift 10 requires less installation space than most prior art lifts.

Having described the invention what is claimed:

1. A lift arrangement for mounting on a vehicle adjacent a doorway of the vehicle, comprising:
   a first electrically powered screw jack mounted to the frame of the vehicle adjacent one side of the doorway;
   a second electrically powered screw jack mounted to the frame of the vehicle adjacent the other side of the doorway;
   a first support bracket positioned adjacent the lower end of said first jack;
   a second support bracket positioned adjacent the lower end of said second jack;
   a platform having a pair of connecting portions disposed adjacent opposite ends of said platform, each connecting portion engaging one of said brackets to support said platform in a generally horizontal manner;
   a switch adapted to be operably coupled with a source of electrical power and with said first and second jacks;
   wherein said first and second jacks may be simultaneously activated by a single switch to lower and raise said platform between a position adjacent the ground surface and an elevated position; and,
   wherein one of said connecting portions is capable of removably engaging said first mounting bracket and the other of said connecting portions is capable of removably engaging said second mounting bracket so that said platform can be supported in a horizontal manner when said connecting portions engage said brackets and can be separated from the vehicle when said connecting portions are disengaged from said brackets.

2. A lift arrangement for mounting on a vehicle adjacent a doorway of the vehicle, comprising:
   a first electrically powered screw jack mounted to the frame of the vehicle adjacent one side of the doorway;
   a second electrically powered screw jack mounted to the frame of the vehicle adjacent the other side of the doorway;
   a first support bracket positioned adjacent the lower end of said first jack;
   a second support bracket positioned adjacent the lower end of said second jack;
   a platform having a pair of connecting portions disposed adjacent opposite ends of said platform, each connecting portion engaging one of said brackets to support said platform in a generally horizontal manner;
   a switch adapted to be operably coupled with a source of electrical power and with said first and second jacks;
   wherein said first and second jacks may be simultaneously activated by a single switch to lower and raise said platform between a position adjacent the ground surface and an elevated position; and
   wherein each jack has a lower end that is generally cylindrical in shape with an outer peripheral surface and an inner surface defining a cylindrical bore, each bracket having an annular slot for removably receiving the lower end of its associated jack, each bracket removably attached to its respective jack by positioning the lower end of said jack in said annular slot.

3. The lift arrangement of claim 2 wherein each slot is formed by an outer cylindrical tube and an inner cylindrical tube disposed in a concentric relationship so that, when one of said brackets is positioned on its respective jack, an inner surface of said outer tube engages said outer peripheral surface of said jack and an outer peripheral surface of said inner cylinder engages said inner surface of said jack.

4. A lift arrangement for mounting on a vehicle adjacent a doorway of the vehicle, comprising:
   a first electrically powered screw jack mounted to the frame of the vehicle adjacent one side of the doorway;
   a second electrically powered screw jack mounted to the frame of the vehicle adjacent the other side of the doorway;
   a first support bracket positioned adjacent the lower end of said first jack;
   a second support bracket positioned adjacent the lower end of said second jack;
   a platform having a pair of connecting portions disposed adjacent opposite ends of said platform, each connecting portion engaging one of said brackets to support said platform in a generally horizontal manner;
   a switch adapted to be operably coupled with a source of electrical power and with said first and second jacks;
   wherein said first and second jacks may be simultaneously activated by a single switch to lower and raise said platform between a position adjacent the ground surface and an elevated position; and
   wherein each bracket has a vertically disposed generally rectangular aperture for removably receiving its respective connecting portion of said platform.

5. The lift arrangement of claim 4 wherein said switch is secured to a flexible cord and can be grasped by a user while the user is positioned on said platform.

* * * * *